United States Patent
Katayama et al.

(10) Patent No.: US 8,381,708 B2
(45) Date of Patent: Feb. 26, 2013

(54) VEHICLE AND VEHICLE CONTROL METHOD

(75) Inventors: Akihiro Katayama, Toyota (JP); Naoto Kato, Susono (JP); Shuntaro Okazaki, Suntou-gun (JP); Kenji Kimura, Redondo Beach, CA (US); Masashi Hakariya, Nagoya (JP); Hiroaki Tsuji, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 283 days.

(21) Appl. No.: 12/999,006

(22) PCT Filed: Jun. 18, 2009

(86) PCT No.: PCT/IB2009/006007
§ 371 (c)(1),
(2), (4) Date: Dec. 14, 2010

(87) PCT Pub. No.: WO2009/153653
PCT Pub. Date: Dec. 23, 2009

(65) Prior Publication Data
US 2011/0100344 A1    May 5, 2011

(30) Foreign Application Priority Data

Jun. 20, 2008   (JP) ................................ 2008-161934

(51) Int. Cl.
*F02D 41/00* (2006.01)
(52) U.S. Cl. ........... 123/703; 701/114; 123/690; 60/276
(58) Field of Classification Search .................. 123/674, 123/690, 703, 704; 702/182, 183, 185; 701/102, 701/103, 109–111, 114; 60/276; 73/114.02–114.04, 114.08, 114.16, 114.39, 114.63
See application file for complete search history.

(56) References Cited

U.S. PATENT DOCUMENTS 5,447,137 A    9/1995 Asano et al.
(Continued)

FOREIGN PATENT DOCUMENTS

| EP | 0 597 232 | 5/1994 |
|----|-----------|--------|
| EP | 0 898 066 | 2/1999 |

(Continued)

OTHER PUBLICATIONS

International Search Report issued Nov. 6, 2009 in PCT/IB09/06007 filed Jun. 18, 2009.

*Primary Examiner* — John T. Kwon
*Assistant Examiner* — Johnny Hoang
(74) *Attorney, Agent, or Firm* — Oblon, Spivak, McClelland, Maier & Neustadt, L.L.P.

(57) ABSTRACT

An engine ECU calculates a rotational variation based on a required rotation time when a complete misfire occurs in a cylinder, a required rotation time when complete combustion occurs in the cylinder, and a required rotation time during the current combustion stroke, and integrates the calculated rotational variation. If it is determined that the number of times the rotational variation has been integrated has reached a predetermined number, the engine ECU calculates an amount of learning value deviation from the integrated rotational variation. If the amount of learning value deviation is equal to or greater than a certain amount, the engine ECU corrects a learning value of a sub-feedback control with respect to the air-fuel ratio.

8 Claims, 7 Drawing Sheets

U.S. PATENT DOCUMENTS

| | | | |
|---|---|---|---|
| 2003/0061802 A1* | 4/2003 | Nakatani et al. | 60/284 |
| 2005/0072139 A1 | 4/2005 | Kato | |
| 2006/0112932 A1 | 6/2006 | Toyoda | |
| 2006/0130457 A1* | 6/2006 | Hirowatari et al. | 60/276 |
| 2007/0000237 A1* | 1/2007 | Toshioka et al. | 60/285 |
| 2007/0261484 A1 | 11/2007 | Nishigaki et al. | |
| 2011/0005207 A1* | 1/2011 | Akihisa et al. | 60/286 |
| 2012/0116651 A1* | 5/2012 | Miyamoto et al. | 701/103 |

FOREIGN PATENT DOCUMENTS

| | | |
|---|---|---|
| JP | 5 222994 | 8/1993 |
| JP | 6 43236 | 6/1994 |
| JP | 10 103139 | 4/1998 |
| JP | 2001 123879 | 5/2001 |
| JP | 2003 184635 | 7/2003 |
| JP | 2007 285194 | 11/2007 |
| WO | 2006 075766 | 7/2006 |

* cited by examiner

VEHICLE AND VEHICLE CONTROL METHOD

BACKGROUND OF THE INVENTION

1. Field of the Invention

The invention relates to a vehicle and a vehicle control method. More particularly, the invention relates to a vehicle provided with an internal combustion engine having a plurality of cylinders, and a control method of that vehicle.

2. Description of the Related Art

A vehicle that is driven by an internal combustion engine is typically provided with an exhaust gas purification catalyst and an air-fuel ratio sensor in an exhaust passage of the internal combustion engine. Moreover, to improve exhaust gas purification performance of the exhaust gas purification catalyst, the vehicle is also provided with a control apparatus that brings the air-fuel ratio of the internal combustion engine close or equal to a stoichiometric air-fuel ratio based on the detection results of the air-fuel ratio sensor.

Japanese Patent Application Publication No. 10-103139 (JP-A-10-103139), for example, describes one such control apparatus that includes air-fuel ratio sensors upstream and downstream of an exhaust gas purification catalyst. This control apparatus performs main feedback control of the air-fuel ratio according to the oxygen concentration in the exhaust gas detected by the upstream air-fuel ratio sensor, and executes air-fuel ratio control that corrects the control value of the main feedback control according to the oxygen concentration in the exhaust gas detected by the downstream air-fuel ratio sensor.

The related control apparatus described in JP-A-10-103139 performs main feedback control that controls the injection quantity of fuel supplied into the cylinders of the internal combustion engine according to the oxygen concentration in the exhaust gas detected by the upstream air-fuel ratio sensor, as well as performs so-called sub-feedback control that corrects the oxygen concentration in the exhaust gas detected by the upstream air-fuel ratio sensor according to the oxygen concentration in the exhaust gas detected by the downstream air-fuel ratio sensor.

Also, with the related control apparatus described in JP-A-10-103139, if a misfire, in which the mixture of air and fuel does not ignite, occurs in the internal combustion engine, the unburned air-fuel mixture is discharged into the exhaust passage. As a result, unburned HC reacts with the residual air in the exhaust gas purification catalyst, which may cause the exhaust gas purification catalyst to overheat. Therefore, the misfire rate of the internal combustion engine is calculated and the main feedback control value is corrected according to the calculated misfire rate.

In this kind of control apparatus, the pressure in the combustion chamber is detected by a pressure sensor and if the detected pressure is equal to or less than a predetermined value, it is determined that a complete misfire has occurred. Also, the misfire rate is obtained by sampling the number of times complete misfires have occurred per a predetermined number of times the cylinder has been fired, and dividing the sampled number of complete misfires by the predetermined number of times the cylinder has been fired.

However, with the related control apparatus of the internal combustion engine described in JP-A-10-103139, although the occurrence of complete misfires in the cylinders of the internal combustion engine is determined, the degree of combustion of the air-fuel mixture in the cylinders is not determined. Therefore, it is not possible to predict the degree of deterioration of the combustion state in the internal combustion engine. As a result, it is not possible to correct the control value of the air-fuel ratio control according to the degree of deterioration of the combustion state.

SUMMARY OF THE INVENTION

This invention thus provides a vehicle provided with an internal combustion engine, as well as a control apparatus of that vehicle, capable of correcting a control value of air-fuel ratio control according to the degree of deterioration of the combustion state in an internal combustion engine.

A first aspect of the invention relates to a vehicle that includes an internal combustion engine having a plurality of cylinders; an exhaust gas purification catalyst which is arranged in an exhaust passage of the internal combustion engine and purifies exhaust gas; first air-fuel ratio detecting means arranged upstream of the exhaust gas purification catalyst; second air-fuel ratio detecting means arranged downstream of the exhaust gas purification catalyst; and a control apparatus of the internal combustion engine. The control apparatus executes main feedback control that controls an air-fuel ratio of the internal combustion engine based on a detection value of the first air-fuel ratio detecting means, and sub-feedback control that calculates a learning value for correcting the main feedback control based on a detection value of the second air-fuel ratio detecting means. The controlling apparatus includes rotational variation calculating means for calculating a rotational variation of an output shaft of the internal combustion engine based on combustion of each of the cylinders, variation integrating means for calculating a cumulative value of the rotational variation by adding the rotational variation calculated by the rotational variation calculating means to the rotational variation integrated thus far; integration counting means for counting the number of times the rotational variation has been integrated by the variation integrating means; combustion state estimating means for estimating a combustion state of the internal combustion engine according to the cumulative value of the rotational variation integrated by the variation integrating means, on the condition that the number of integrations counted by the integration counting means has reached a predetermined value; and learning value correcting means for correcting the learning value of the sub-feedback control according to the combustion state estimated by the combustion state estimating means.

In the first aspect described above, the control apparatus may also include rotational position detecting means for detecting a rotational position of the output shaft of the internal combustion engine, and required time calculating means for calculating the required time that it takes for the output shaft to rotate a predetermined angle from the combustion stroke of the cylinders, based on the rotational position of the output shaft detected by the rotational position detecting means. Also, the rotational variation calculating means may calculate the rotational variation of the output shaft based on a pre-obtained required time during a complete misfire, which is the time that it takes for the output shaft to rotate the predetermined angle when a complete misfire occurs in the cylinders during the combustion stroke, and a pre-obtained required time during complete combustion, which is the time that it takes for the output shaft to rotate the predetermined angle when complete combustion occurs in the cylinders during the combustion stroke, and the required time calculated by the required time calculating means.

According to this structure, the combustion state of the internal combustion engine is estimated based on the degree of rotational variation of the output shaft of the internal combustion engine so it is possible to estimate not only the combustion state in the cylinders during a complete misfire, but also the combustion state between a complete misfire and complete combustion. Also, the degree of rotational variation is added up a predetermined number of times, which makes it possible to estimate the degree of deterioration of the combustion state that is occurring in the internal combustion engine. Accordingly, it is possible to correct the air-fuel ratio control according to the estimated degree of deterioration of the combustion state.

In the first aspect described above, the control apparatus may also include disturbance detecting means for detecting a disturbance that contributes to variation in the combustion state of the internal combustion engine. Also, the variation integrating means may stop integrating the rotational variation when a disturbance that contributes to variation in the combustion state is detected by the disturbance detecting means.

According to this structure, it is possible to inhibit rotational variation which may not accurately indicate the combustion state from being integrated when the combustion state tends to vary. Accordingly, integrating the rotational variation only when the combustion state is stable makes it possible to further improve the accuracy of estimating the degree of deterioration of the combustion state.

The disturbance detecting means may detect a load of the internal combustion engine being equal to or less than a predetermined value as a disturbance that contributes to variation in the combustion state.

According to this structure, it is possible to inhibit rotational variation which may not accurately indicate the combustion state from being integrated when the internal combustion engine is in a low load state and the combustion state tends to vary. Accordingly, integrating the rotational variation only when the combustion state is stable makes it possible to further improve the accuracy of estimating the degree of deterioration of the combustion state.

The disturbance detecting means may detect a coolant temperature of the internal combustion engine being equal to or less than a predetermined value as a disturbance that contributes to variation in the combustion state.

According to this structure, it is possible to inhibit rotational variation which may not accurately indicate the combustion state from being integrated when the combustion state tends to vary, such as during a cold start of the internal combustion engine. Accordingly, integrating the rotational variation only when the combustion state is stable makes it possible to further improve the accuracy of estimating the degree of deterioration of the combustion state.

According to the first aspect of the invention, the control value of air-fuel ratio control can be corrected according to the degree of deterioration of the combustion state of the internal combustion engine.

A second aspect of the invention relates to a control method of a vehicle that includes an internal combustion engine having a plurality of cylinders; an exhaust gas purification catalyst which is arranged in an exhaust passage of the internal combustion engine and purifies exhaust gas; first air-fuel ratio detecting means arranged upstream of the exhaust gas purification catalyst; second air-fuel ratio detecting means arranged downstream of the exhaust gas purification catalyst; and a control apparatus of the internal combustion engine. This control method includes executing main feedback control that controls an air-fuel ratio of the internal combustion engine based on a detection value of the first air-fuel ratio detecting means; executing sub-feedback control that calculates a learning value for correcting the main feedback control based on a detection value of the second air-fuel ratio detecting means; calculating a rotational variation of an output shaft of the internal combustion engine based on combustion of each of the cylinders; calculating a cumulative value of the rotational variation by adding the calculated rotational variation to the rotational variation integrated thus far; counting the number of times the rotational variation has been integrated; estimating a combustion state of the internal combustion engine according to the cumulative value of integrated rotational variation, on the condition that the number of counted integrations has reached a predetermined value; and correcting the learning value of the sub-feedback control according to the estimated combustion state.

A third aspect of the invention relates to a vehicle that includes an internal combustion engine having a plurality of cylinders; an exhaust gas purification catalyst which is arranged in an exhaust passage of the internal combustion engine and purifies exhaust gas; a first air-fuel ratio detecting portion that is, arranged upstream of the exhaust gas purification catalyst; a second air-fuel ratio detecting portion that is arranged downstream of the exhaust gas purification catalyst; and a control apparatus of the internal combustion engine. The control apparatus executes main feedback control that controls an air-fuel ratio of the internal combustion engine based on a detection value of the first air-fuel ratio detecting portion, and sub-feedback control that calculates a learning value for correcting the main feedback control based on a detection value of the second air-fuel ratio detecting portion. The controlling apparatus includes a rotational variation calculating portion that calculates a rotational variation of an output shaft of the internal combustion engine based on combustion of each of the cylinders, a variation integrating portion that calculates a cumulative value of the rotational variation by adding the rotational variation calculated by the rotational variation calculating portion to the rotational variation integrated thus far, an integration counting portion that counts the number of times the rotational variation has been integrated by the variation integrating portion, a combustion state estimating portion that estimates a combustion state of the internal combustion engine according to the cumulative value of the rotational variation integrated by the variation integrating portion, on the condition that the number of integrations counted by the integration counting portion has reached a predetermined value; and a learning value correcting portion that corrects the learning value of the sub-feedback control according to the combustion state estimated by the combustion state estimating portion.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
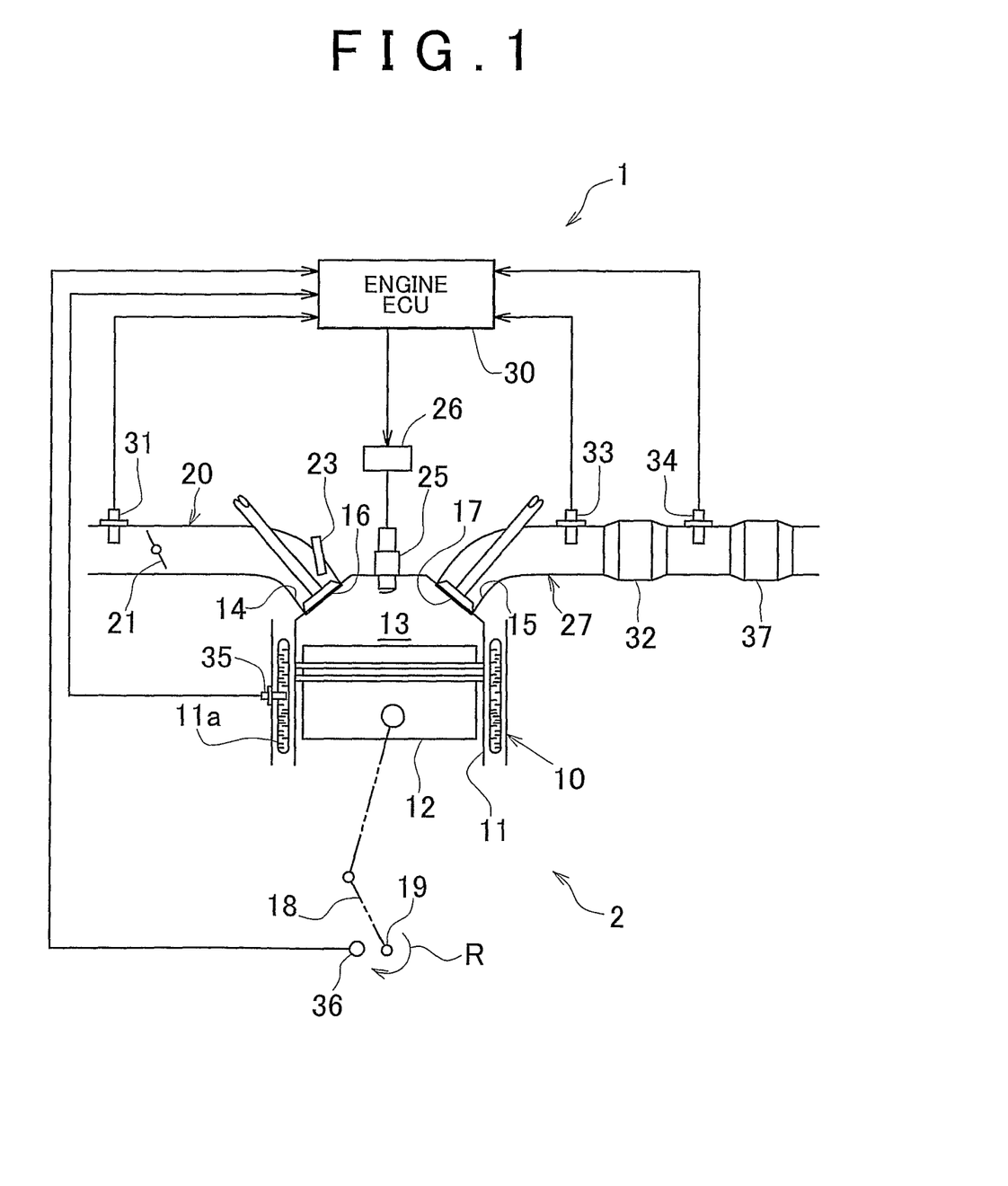
FIG. 1 is a block diagram schematically showing a frame format of a vehicle provided with a control apparatus of an internal combustion engine according to a first example embodiment of the invention.
Figure 2:
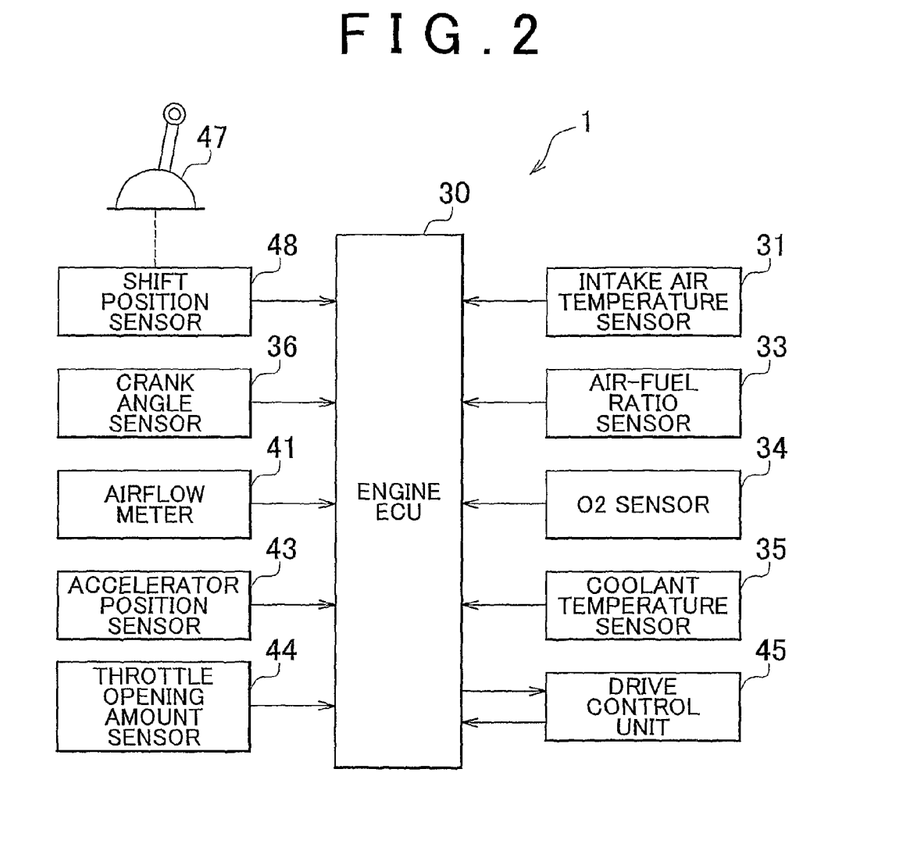
FIG. 2 is a block diagram showing the control apparatus of the internal combustion engine according to the first example embodiment of the invention.

Example embodiments of the present invention will be described in greater detail below with reference to the accompanying drawings. FIG. 1 is a block diagram schematically showing a frame format of a vehicle provided with a control apparatus of an internal combustion engine according to a first example embodiment of the invention, and FIG. 2 is a block diagram showing the control apparatus of the internal combustion engine according to the first example embodiment of the invention. Incidentally, in this example embodiment, the vehicle 1 is provided with a four-cylinder gasoline engine 2.

The engine 2 mounted in the vehicle 1 has a combustion chamber 13 which is divided by a piston 12 in each cylinder 11 of an engine block 10. The piston 12 and intake and exhaust valves 16 and 17 are provided in the combustion chamber 13. The piston 12 moves in connection with crank rotation (shown by arrow R in FIG. 1) of a crankshaft 19 which will be described later. The intake valve 16 is driven open at a predetermined timing by an intake camshaft, not shown, in response to the crank rotation according to the stroke of the piston 12. Similarly, the exhaust valve 17 is driven open at a predetermined timing by an exhaust camshaft, not shown, in response to the crank rotation according to the stroke of the piston 12.

The intake and exhaust valves 16 and 17 are urged by valve springs, not shown, in a direction in which they close intake and exhaust ports 14 and 15, respectively. As the intake and exhaust camshafts rotate, cams on the camshafts force the valves down away from the intake and exhaust ports 14 and 15, thereby opening those ports.

Also, a mixture of air and fuel (gasoline in this case) is drawn into the cylinder 11 through the intake port 14 during the intake stroke. Then following the compression and expansion (i.e., combustion) strokes, exhaust gas is discharged from the exhaust port 15 during the exhaust stroke.

A throttle valve 21 is provided in an intake pipe 20 that forms the intake port 14, and a fuel injector 23 is arranged near the combustion chamber 13 downstream of the throttle valve 21. Also, a spark plug 25 is arranged so as to protrude out into the combustion chamber 13.

The engine 2 is also provided with an igniter 26 that outputs an ignition signal to the spark plug 25. The fuel injection timing of the fuel injector 23 and the ignition timing of the spark plug 25 are controlled by a drive control unit 45 (see FIG. 2).

The engine 2 has four cylinders 11. The piston 12 is housed in each cylinder so as to be able to move in a reciprocating manner. The piston 12 is connected to the crankshaft 19 via a connecting rod 18. The reciprocating motion of the piston 12 is converted into rotary motion by the connecting rod 18 and transmitted to the crankshaft 19 which serves as the output shaft.

The air-fuel mixture in the combustion chamber 13 is ignited by a spark from the spark plug 25 and combusts. High temperature, high pressure combustion gases produced by this combustion force the piston 12 to move in a reciprocating manner, which causes the crankshaft 19 to rotate via the connecting rod 18. As a result, driving force is obtained from the engine 2.

The combustion chamber 13 formed in each cylinder 11 is connected to the intake pipe 20 and an exhaust pipe 27. The intake pipe 20 also has a surge tank and an intake manifold, neither of which are shown. Air from outside of the vehicle 1 is supplied to the combustion chamber 13 via the throttle valve 21, the surge tank, and the intake manifold.

The throttle valve 21 is pivotally provided in the intake pipe 20 and is pivoted by an actuator, not shown. The actuator pivots the throttle valve 21 according to the depression amount of an accelerator pedal, not shown, of the vehicle 1. Also, a throttle opening amount sensor 44 (see FIG. 2) is provided with the throttle valve 21. This throttle opening amount sensor 44 outputs a signal indicative of the opening amount of the throttle valve 21 to an engine ECU 30 which will be described later.

Exhaust gas purification catalysts 32 and 37, which are formed by three-way catalysts, are arranged in the exhaust pipe 27. Exhaust gas discharged from the combustion chamber 13 is discharged out of the engine 2 through these two exhaust gas purification catalysts 32 and 37.

An air-fuel ratio sensor 33 is arranged in the exhaust pipe 27 upstream of the exhaust gas purification catalyst 32. This air-fuel ratio sensor 33 outputs a voltage Vaf that corresponds to the air-fuel ratio to the engine ECU 30 based on the concentration of unburned fuel components and the oxygen concentration in the exhaust gas that is detected. Incidentally, the air-fuel ratio sensor 33 according to this example embodiment functions as air-fuel ratio detecting means arranged upstream according to the invention.

Also, an O2 sensor 34 is arranged in the exhaust pipe 27 downstream of the exhaust gas purification catalyst 32. This O2 sensor 34 outputs a voltage Vo2 that corresponds to the air-fuel ratio to the engine ECU 30 based on the oxygen concentration in the exhaust gas that is detected. Incidentally, the O2 sensor 34 in this example embodiment functions as air-fuel ratio detecting means arranged downstream according to the invention.

Further, an airflow meter 41 (see FIG. 2) that detects the amount of air drawn into the intake pipe 20, as well as an intake air temperature sensor 31 that detects the temperature of the air drawn into the intake pipe 20, are arranged in the intake pipe 20. The airflow meter 41 outputs a signal indicative of the detected intake air amount to the engine ECU 30, and the intake air temperature sensor 31 outputs a signal indicative of the detected intake air temperature to the engine ECU 30.

Further, the vehicle 1 is provided with a crank angle sensor 36 that detects the rotational position of the crankshaft 19. This crank angle sensor 36 outputs a signal indicative of the detected rotational position of the crankshaft 19 to the engine ECU 30.

A rotor, not shown, having external teeth formed at predetermined intervals on the outer peripheral surface is arranged on the crankshaft 19. An electromagnetic pickup, not shown, that forms the crank angle sensor 36 is provided facing these external teeth. The rotor rotates together with the crankshaft 19 and when an external tooth of the rotor approaches the electromagnetic pickup, the electromagnetic pickup produces a pulse signal. Also, the engine ECU 30 receives a signal indicative of whether the air-fuel mixture has ignited in one of the cylinders from the drive control unit 45.

Therefore, the engine ECU 30 is able to match the rotational position of the crankshaft 19 to the cylinder 11 in which the combustion stroke is taking place by detecting the rotational position of the crankshaft 19 using the crank angle sensor 36 while obtaining the signal indicative of the cylinder 11 that has fired from the drive control unit 45. Then the engine ECU 30 can obtain the rotation speed of the crankshaft 19 during the combustion stroke of the cylinders 11.

Incidentally, the crank angle sensor 36 and the engine ECU 30 function as rotational position detecting means according to the invention.

The engine ECU 30 is provided in the vehicle 1 to control the operating state of the engine 2. The engine ECU 30 is formed by a microcomputer that includes a Central Processing Unit (CPU), Random Access Memory (RAM), Read Only Memory (ROM), an input interface, and an output interface and the like. The CPU executes output control of the engine 2 and the like by processing signals according to programs stored in advance in the ROM while using the temporary storage function of the RAM.

Incidentally, the engine ECU 30 functions as a control apparatus of the internal combustion engine, required time calculating means, rotational variation calculating means, variation integrating means, cumulative counting means, combustion state estimating means, learning value correcting means, and disturbance detecting means, as will be described later.

The engine ECU 30 receives signals indicative of the oxygen concentration of the exhaust gas introduced into the exhaust gas purification catalyst 32, which is detected by the air-fuel ratio sensor 33, and the oxygen concentration of the exhaust gas that has passed through the exhaust gas purification catalyst 32, which is detected by the O2 sensor 34. Further, the vehicle 1 also has a coolant temperature sensor 35 which detects the temperature of coolant in the engine 2 and outputs a signal indicative of that coolant temperature to the engine ECU 30.

As shown in FIG. 2, the vehicle 1 has a shift lever 47 that a driver uses to input a range command, and a shift position sensor 48 that detects the position of the shift lever 47. The shift position sensor 48 outputs a signal indicative of the position of the shift lever 47 to the engine ECU 30.

The vehicle 1 also has an accelerator position sensor 43 that detects the depression amount of an accelerator pedal, not shown, by the driver. This accelerator position sensor 43 outputs a signal indicative of the detected depression amount of the accelerator pedal to the engine ECU 30.

The characteristic structure of the engine ECU that forms the control apparatus of the internal combustion engine according to this example embodiment of the invention will now be described with reference to FIGS. 1 and 2.

The engine ECU 30 that forms the control apparatus of the engine 2 receives a signal indicative of the rotational position of the crankshaft 19 from the crank angle sensor 36 and a signal indicative of the cylinder 11 in the combustion stroke 11 from the drive control unit 45, as described above, and calculates the required time necessary for the crankshaft 19 to rotate 180° for the cylinder 11 in the combustion stroke.

More specifically, the engine ECU 30 calculates the time $T_{30}$ that it takes for the crankshaft 19 to rotate 30° based on the signal received from the crank angle sensor 36. At this time, the crankshaft 19 rotates 180° due to the combustion stroke of the cylinders 11. Therefore, the engine ECU 30 calculates the required time necessary for the crankshaft 19 to rotate 180° by obtaining the $T_{30}$ for one cycle of the combustion stroke in each cylinder 11 six times and adding these values together.

Therefore, the engine ECU 30 according to this example embodiment functions as required time calculating means according to the invention.

Also, if a compete misfire, in which the air-fuel mixture does not combust at all even though the air-fuel mixture was ignited, occurs in any of the cylinders 11, the engine ECU 30 stores the time required for the crankshaft 19 to rotate 180° during the combustion stroke of this cylinder as the "required time during a complete misfire" in the ROM beforehand. The required time during a complete misfire is obtained by taking empirical measurements beforehand and is stored in the ROM in the form of a required time (complete misfire) map corresponding to the speed of the engine 2. Therefore, when the engine ECU 30 calculates the required time during a complete misfire, it calculates the current speed of the engine 2 based on the signal received from the crank angle sensor 36, and obtains the required time during a complete misfire that corresponds to the calculated speed of the engine 2 from the required time (complete misfire) map.

The engine ECU 30 also stores the time required for the crankshaft 19 to rotate 180° during the combustion stroke when the air-fuel mixture is ignited and completely combusts in one of the cylinders 11 as the "required time during complete combustion" in the ROM beforehand. The required time during complete combustion is obtained by taking empirical measurements beforehand and is stored in the ROM in the form of a required time (complete combustion) map corresponding to the speed of the engine 2.

Incidentally, the time required for the crankshaft 19 to rotate 180° during the combustion stroke right before the current rotational variation of the cylinder 11 is calculated may also be used as the required time during complete combustion. In this case, the engine ECU 30 calculates the required time during complete combustion and stores it in the RAM.

The engine ECU 30 then calculates the rotational variation of the crankshaft 19 based on the required time calculated as described above, as well as the required time during a complete misfire and the required time during complete combustion stored in the ROM beforehand.

More specifically, the engine ECU 30 calculates the difference between the current required time and the required time during complete combustion, as well as calculates the difference between the required time during a complete misfire and the required time during complete combustion. Next, the engine ECU 30 calculates the ratio of the difference between the current required time and the required time during complete combustion to the difference between the required time during a complete misfire and the required time during complete combustion. The current rotational variation is such that, when the rotational variation corresponding to the required time during complete combustion is given a value of 0 and the rotational variation corresponding to the required time during a complete misfire is given a value of 1, the ratio of the difference between the current required time and the required time during complete combustion to the difference between the required time during a complete misfire and the required time during complete combustion is expressed as a rotational variation between 0 and 1.

Therefore, the engine ECU 30 according to this example embodiment functions as rotational variation calculating means according to the invention.

The engine ECU 30 also calculates the cumulative value of the rotational variation by adding the currently calculated rotational variation to the cumulative value of the rotational variation integrated thus far. More specifically, once the engine ECU 30 calculates the current rotational variation, it adds the value of this currently calculated rotational variation to the cumulative value of the rotational variation integrated thus far that is stored in the RAM, and then stores the sum of these as the new cumulative rotational variation in the RAM. Accordingly, the engine ECU 30 according to this example embodiment functions as variation integrating means according to the invention.

Figure 3:
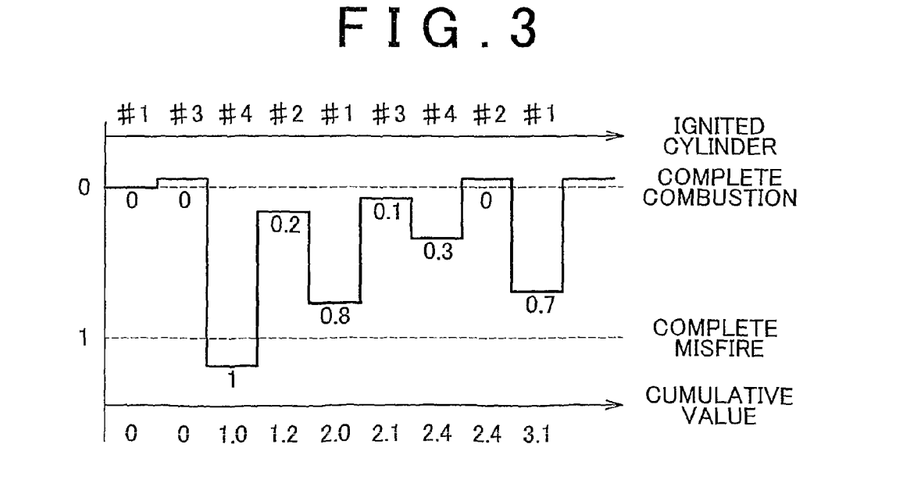
FIG. 3 is a chart showing a method for calculating the cumulative value of rotational variation according to the first example embodiment of the invention.

FIG. 3 is a chart showing a method for calculating the cumulative value of rotational variation according to the first example embodiment of the invention.

The engine ECU 30 obtains the required time during a complete misfire corresponding to the current speed of the engine 2 from the required time (complete misfire) map stored in the ROM beforehand, and gives the rotational variation that corresponds to this required time during a complete misfire a value of 1, while giving the rotational variation that corresponds to the required time during complete combustion a value of 0. The engine ECU 30 then calculates the rotational variation that corresponds to the current required time from the ratio of these required times to the required time calculated for the cylinder that is currently in the combustion stroke. Incidentally, if the value of the currently calculated required time is equal to or greater than the required time during a misfire, the engine ECU 30 gives the current rotational variation a value of 1. If, on the other hand, the value of the currently calculated required time is equal to or less than the required time during complete combustion, the engine ECU 30 gives the current rotational variation a value of 0.

Returning now to FIGS. 1 and 2, the engine ECU 30 estimates the combustion state of the engine 2 by adding up (i.e., integrating) the rotational variation a predetermined number of times. Therefore, the engine ECU 30 counts the number of times the rotational variation has been integrated (hereinafter simply referred to as the "number of integrations") each time it integrates the rotational variation. More specifically, the engine ECU 30 stores the number of times the rotational variation has been integrated in the RAM. Each time the engine ECU 30 calculates the rotational variation and adds the value of the currently calculated rotational variation to the cumulative value of the rotational variation integrated thus far, the engine ECU 30 increases the number of integrations by 1. Therefore, the engine ECU 30 according to this example embodiment functions as integration counting means according to the invention.

Also, the engine ECU 30 estimates the combustion state of the engine 2 according to the cumulative value of the rotational variation integrated in the RAM while referencing a map that will be described later.

In the vehicle 1 according to this example embodiment, the engine ECU 30 executes main feedback control that controls the fuel injection quantity supplied to the cylinder 11 based on the voltage value received from the air-fuel ratio sensor 33. In addition, the engine ECU 30 also executes sub-feedback control that corrects the main feedback control based on the voltage value received from the O2 sensor 34.

In the sub-feedback control, the engine ECU 30 calculates a so-called learning value by integrating the difference between the voltage value output from the O2 sensor 34 at the stoichiometric air-fuel ratio and the actual voltage value output from the O2 sensor 34 by time. The main feedback control is corrected with this learning value. Incidentally, the sub-feedback control may also be formed by a well-known feedback control having an integral term, such as PID control. The main feedback control and the sub-feedback control are executed independently of a learning value correcting routine of this example embodiment. Therefore, when the amount of learning value deviation is calculated by the learning value correcting routine, as will be described later, the learning value of the sub-feedback control is corrected by this amount of learning value deviation. Therefore, the learning value correcting routine according to the invention can easily be applied to feedback control of the air-fuel ratio.

Here, when the combustion state of the engine 2 has deteriorated, fuel that has been injected into the cylinder 11 flows into the exhaust pipe 27 without being completely combusted, which adversely affects the exhaust gas purification catalyst 32. Therefore, the main feedback control must be quickly corrected to reduce the quantity of fuel that is injected into the cylinder 11. However, the learning value calculated by the sub-feedback control is integrated by time so the change in the correction value with respect to time is gradual.

On the other hand, the learning value used to correct the main feedback control with respect to the degree of deterioration of the combustion state of the engine 2 can be obtained by taking empirical measurements in advance. Therefore, the engine ECU 30 estimates the degree of change in the combustion state of the engine 2 by integrating the rotational variation, and corrects the learning value of the sub-feedback control according to the degree of deterioration.

Figure 4:
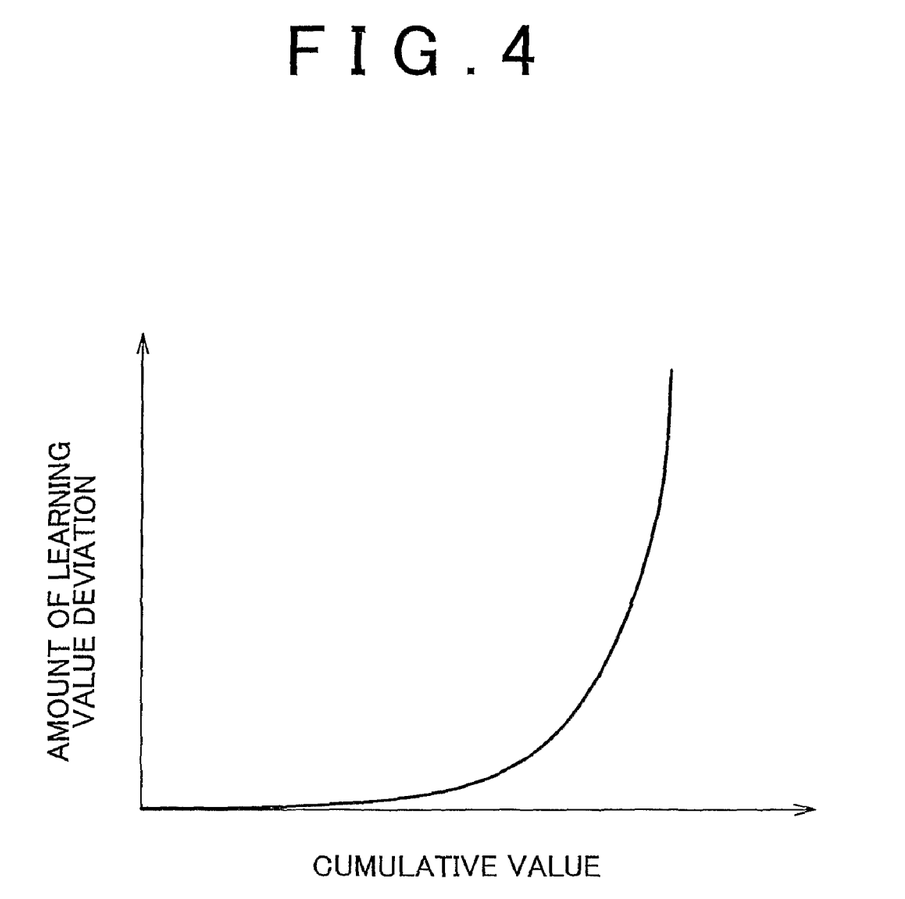
FIG. 4 is a graph showing a cumulative value map of the relationship between the cumulative variation value and the amount of learning value deviation.

FIG. 4 is a graph showing a cumulative value map of the relationship between the cumulative variation value and the amount of learning value deviation.

When the number of integrations of the rotational variation reaches a predetermined value and the cumulative value of the rotational variation, which indicates the degree of deterioration of the combustion state of the engine 2, is calculated, the engine ECU 30 obtains the amount of learning value deviation that corresponds to the combustion state of the engine 2 by referencing the cumulative value map stored in the ROM. Therefore, the engine ECU 30 according to this example embodiment functions as combustion state estimating means according to the invention.

Also, because the engine ECU 30 corrects the learning value calculated by the sub-feedback control by the amount of learning value deviation, the engine ECU 30 also functions as learning value correcting means according to the invention.

Incidentally, the main feedback control is corrected according to the amount of learning value deviation only when the cumulative value of the rotational variation is equal to or greater than the predetermined value. This makes it possible to inhibit the learning value from being corrected unnecessarily due to measurement errors.

Figure 5:
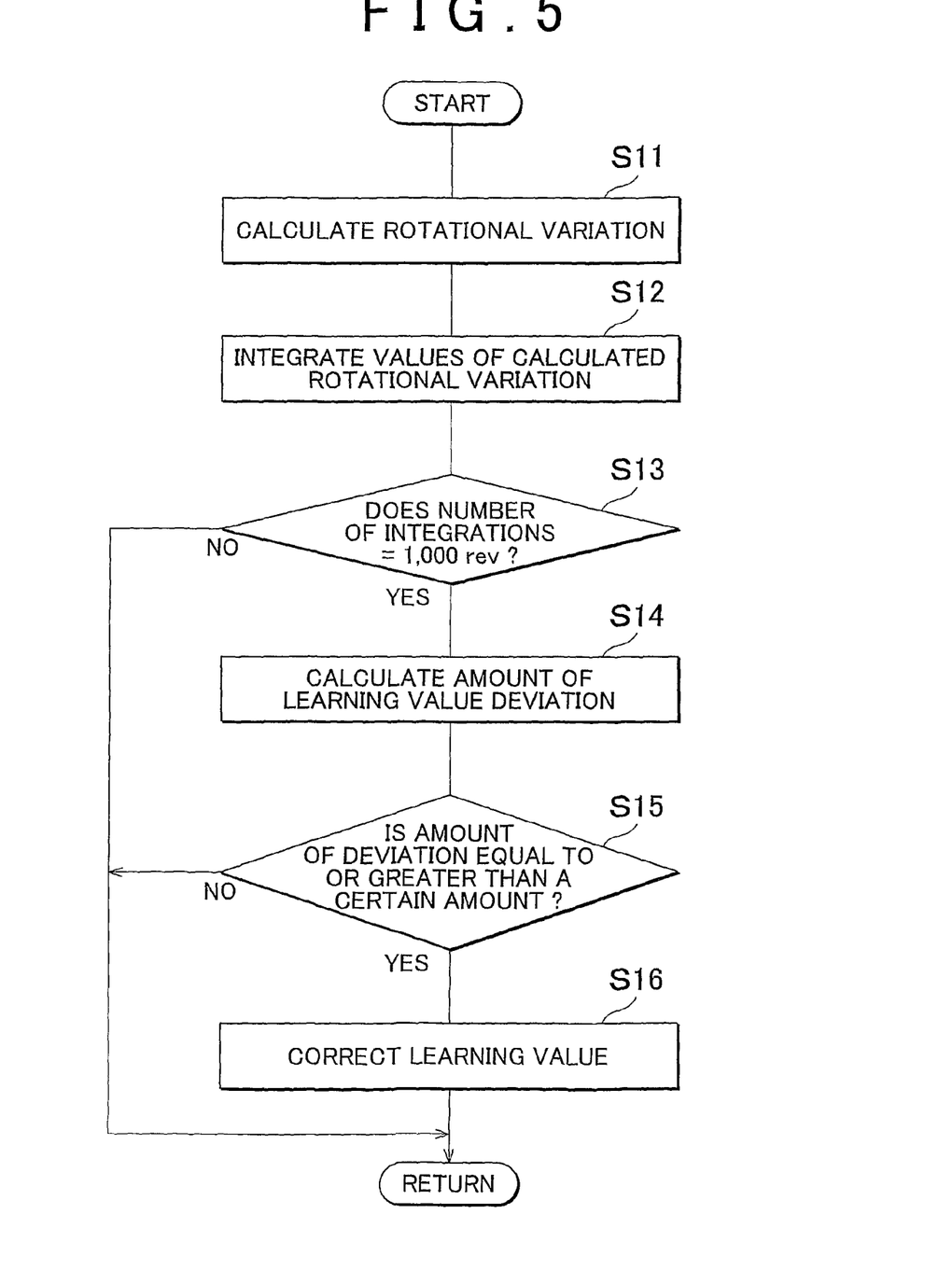
FIG. 5 is a flowchart illustrating a learning value correcting routine according to the first example embodiment of the invention.

FIG. 5 is a flowchart illustrating a learning value correcting routine according to the first example embodiment of the invention.

This routine, which is described below, is executed by the CPU in the engine ECU 30 at predetermined intervals of time and realizes a program able to be processed by the CPU.

First, the engine ECU 30 calculates the rotational variation during the combustion stroke of the cylinder 11 (step S11). More specifically, the engine ECU 30 calculates the time $T_{30}$ that it takes for the crankshaft 19 to rotate 30° based on the signal received from the crank angle sensor 36. At this time, the crankshaft 19 rotates 180° due to the combustion stroke in the cylinders 11. Therefore, the engine ECU 30 calculates the time $T_{30}$ for one combustion stroke in each cylinder 11 six times and adds these values together as the current required time.

Also, when the rotational variation that corresponds to the required time during a complete misfire is given a value of 1 and the rotational variation that corresponds to the required time during complete combustion is given a value of 0, the engine ECU 30 calculates the rotational variation that corresponds to the current required time from the ratio of these required times to the current required time.

More specifically, the engine ECU 30 calculates the difference between the current required time and the required time during complete combustion, as well as calculates the difference between the required time during a complete misfire and the required time during complete combustion. Next, the engine ECU 30 calculates the ratio of the difference between the current required time and the required time during complete combustion to the difference between the required time during a complete misfire and the required time during complete combustion. The current rotational variation is such that, when the rotational variation corresponding to the required time during complete combustion is given a value of 0 and the rotational variation corresponding to the required time during a complete misfire is given a value of 1, the ratio of the difference between the current required time and the required time during complete combustion to the difference between the required time during a complete misfire and the required time during complete combustion is expressed as a rotational variation between 0 and 1.

Incidentally, the required time during complete combustion in this example embodiment is calculated based on the current speed of the engine 2 and the required time (complete combustion) map that is stored in the ROM beforehand, as described above. Also, the required time during a complete misfire is calculated based on the current speed of the engine 2 and the required time (complete misfire) map that is stored in the ROM beforehand, as described above.

Next, the engine ECU 30 integrates the rotational variation calculated in step S11 (step S12). More specifically, the engine ECU 30 adds the rotational variation calculated in step S11 to the cumulative value of the rotational variation thus far that is stored in the RAM. At this time, the engine ECU 30 increases a counter that counts the number of integrations (hereinafter simply referred to as the "integration counter") in the RAM by 1.

Next, the engine ECU 30 references the integration counter in the RAM and determines whether the counter value has reached 1,000 (step S13).

If the engine ECU 30 determines that the integration counter value has reached 1,000 (i.e., Yes in step S13), the process proceeds on to step S14. In this case, the engine ECU 30 resets the integration counter value. If, on the other hand, the engine ECU 30 determines that the integration counter value has not reached 1,000 (i.e., No in step S13), the process returns to the beginning of the routine.

Next, the engine ECU 30 calculates the amount of learning value deviation (step S14). More specifically, the engine ECU 30 obtains the cumulative variation value stored in the RAM and calculates the amount of learning value deviation based on the cumulative value map stored in the ROM.

Next, the engine ECU 30 determines whether the amount of learning value deviation calculated in step S14 is equal to or greater than a predetermined value (step S15). If the engine ECU 30 determines that the amount of learning value deviation is equal to or greater than the predetermined value (i.e., Yes in step S15), then the process proceeds on to step S16. If, on the other hand, the engine ECU 30 determines that the amount of learning value deviation is less than the predetermined value (i.e., No in step S15), the process returns to the beginning of the routine.

Next, the engine ECU 30 corrects the learning value of the sub-feedback control (step S16). More specifically, in sub-feedback control, the engine ECU 30 corrects the value of an integral term in which the difference between the output value from the O2 sensor 34 and a value corresponding to the stoichiometric air-fuel ratio has been integrated, by the amount of learning value deviation calculated in step S14. For example, when the amount of learning value deviation represents a value to be subtracted from the learning value, the engine ECU 30 subtracts the amount of learning value deviation calculated in step S14 from the learning value obtained by the sub-feedback control, and corrects the control value of the main feedback control by the resultant learning value.

As described above, in the control apparatus of the internal combustion engine according to this first example embodiment of the invention, the combustion state of the engine 2 is estimated based on the degree of rotational variation of the crankshaft 19 of the engine 2. Therefore, it is possible to estimate not only the combustion state in the cylinders 11 during a complete misfire, but also the combustion state between a complete misfire and complete combustion. Also, the degree of rotational variation is integrated a predetermined number of times, which makes it possible to estimate the degree of deterioration of the combustion state that is occurring in the engine 2. Accordingly, it is possible to correct the air-fuel ratio control according to the estimated degree of deterioration of the combustion state.

In the foregoing description, the engine 2 is a four-cylinder engine. Alternatively, however, the engine 2 may be an engine with a different number of cylinders, such as a six-cylinder engine. Also, in the foregoing description, the threshold value of the counter value used by the engine ECU 30 to make the determination in step S13 of the learning value correcting routine is 1,000. Alternatively, however, that threshold value may be a value that is less than 1,000 or a value that is greater than 1,000.

For example, when it is necessary to increase the speed with which the amount of learning value deviation is calculated, the threshold value is set to a value less than 1,000. Conversely, when it is necessary to increase the accuracy with which the amount of learning value deviation is calculated, the threshold value is set to a value greater than 1,000.

Incidentally, in the example embodiment described above, the engine ECU 30 constantly calculates the degree of deterioration of the combustion state while the crankshaft 19 is rotating, but the invention is not limited to this. That is, the engine ECU 30 may also calculate the degree of deterioration of the combustion state only under a predetermined condition, as will now be described in a second example embodiment.

A control apparatus of an internal combustion engine according to the second example embodiment of the invention will now be described with reference to FIGS. 6 to 9.

Incidentally, the structure of the control apparatus of an internal combustion engine according to this second example embodiment is generally the same as the structure of the control apparatus of an internal combustion engine according to the first example embodiment described above. Therefore, constituent elements in the second example embodiment which are the same as those in the first example embodiment will be denoted by the same reference characters that are used in FIGS. 1 and 2. In particular, only the differences will be described in detail.

The engine ECU 30 does not update the cumulative variation value if it is determined, based on signals received from the sensors described above which are provided in the vehicle 1, that the engine 2 has just been started up or that the operating state of the engine 2 is such that the combustion state may become unstable.

More specifically, the engine ECU 30 calculates the engine load and determines whether the calculated engine load is greater than 20%.

Here, the engine load is calculated by obtaining the intake air amount detected by the airflow meter 41 and the throttle opening amount detected by the throttle opening amount sensor 44 (see FIG. 2), or the volumetric efficiency and the cylinder pressure, and referencing an engine load calculation map stored in the ROM. Therefore, the engine ECU 30, the airflow meter 41, and the throttle opening amount sensor 44 according to this example embodiment function as disturbance detecting means according to the invention.

If the engine ECU 30 determines that the engine load is 20% or less, the engine is in a low load state and the combustion state may become unstable so the engine ECU 30 stops updating the cumulative variation value and increasing the integration counter in the RAM.

The engine ECU 30 also determines whether the engine 2 has just been cold-started. More specifically, the engine ECU 30 determines that the engine 2 has just been cold-started if a signal indicating that the engine coolant temperature is equal to or less than −10° C. is received from the coolant temperature sensor 35. In this case, the combustion state may become unstable so the engine ECU 30 stops updating the cumulative variation value and increasing the integration counter in the RAM. Therefore, the engine ECU 30 and the coolant temperature sensor 35 according to this example embodiment function as disturbance detecting means according to the invention.

Figure 6:
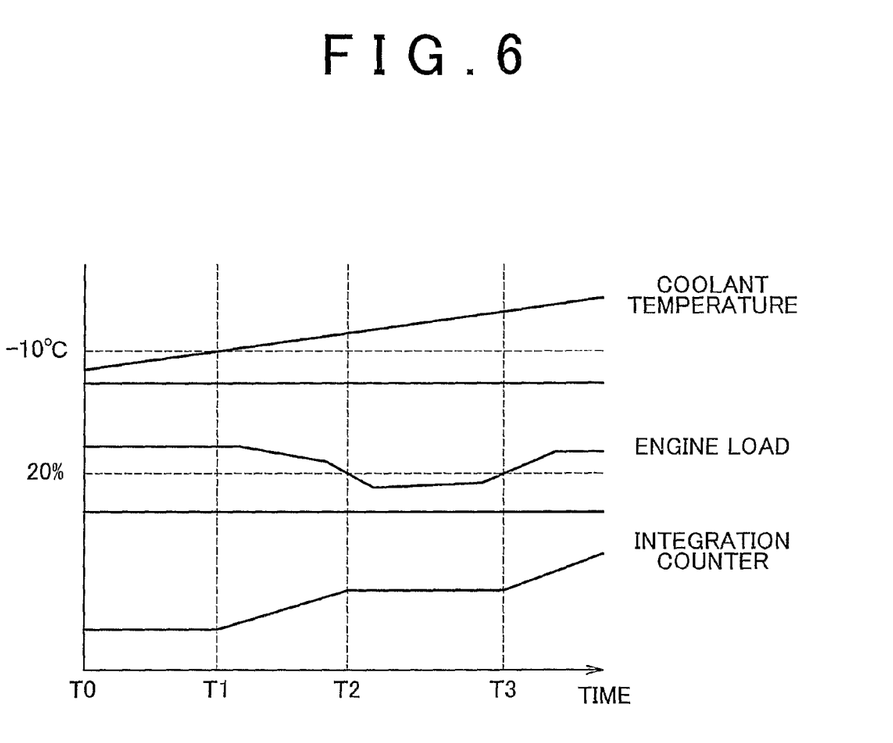
FIG. 6 is a timing chart illustrating a combustion state determining process according to a second example embodiment of the invention.

FIG. 6 is a timing chart illustrating a combustion state determining process according to the second example embodiment of the invention.

At time T0, the engine ECU 30 receives a signal indicative of the coolant temperature of the engine 2 from the coolant temperature sensor 35. At this time, the coolant temperature is equal to or less than −10° C. so the engine ECU 30 stops integrating the rotational variation and increasing the integration counter.

Next at time T1, the engine ECU 30 receives a signal indicating that the coolant temperature of the engine 2 is above −10° C. from the coolant temperature sensor 35 so the engine ECU 30 starts to integrate the rotational variation and increases the value of the integration counter by 1 each time the rotational variation is integrated.

Then at time T2, the engine ECU 30 determines that the engine load has become equal to or less than 20% based on the signal indicative of the intake air amount received from the airflow meter 41, the signal indicative of the throttle opening amount received from the throttle opening amount sensor 44, and the engine load calculation map stored in the ROM. At this time, the engine ECU 30 stops integrating the rotational variation and increasing the integration counter.

Next at time T3, the engine ECU 30 determines that the engine load has exceeded 20% based on the signal indicative of the intake air amount received from the airflow meter 41, the signal indicative of the throttle opening amount received from the throttle opening amount sensor 44, and the engine load calculation map stored in the ROM. As a result, the engine ECU 30 starts integrating the rotational variation and increasing the integration counter again.

Figure 7:
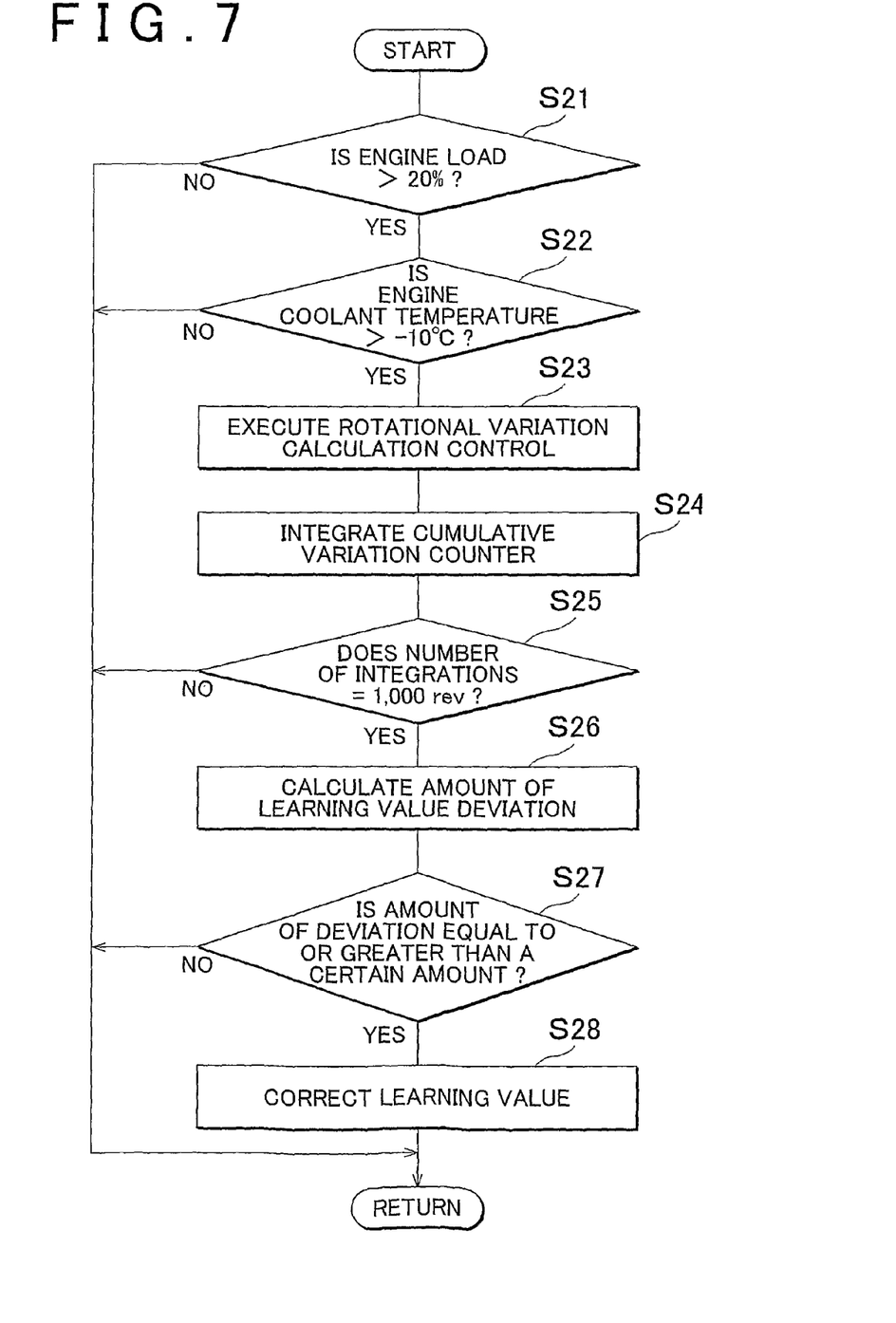
FIG. 7 is a flowchart illustrating the learning value correcting routine according to the second example embodiment of the invention.

FIG. 7 is a flowchart illustrating a learning value correcting routine according to the second example embodiment of the invention.

This routine, which is described below, is executed by the CPU in the engine ECU 30 at predetermined intervals of time and realizes a program able to be processed by the CPU.

First, the engine ECU 30 determines whether the engine load is greater than 20% (step S21). More specifically, the engine ECU 30 calculates the engine load by obtaining the intake air amount detected by the airflow meter 41, the throttle opening amount detected by the throttle opening amount sensor 44, and the accelerator depression amount detected by the accelerator position sensor 43, or the volumetric efficiency and the cylinder pressure, and referencing the engine load calculation map stored in the ROM. If the engine ECU 30 determines that the engine load is greater than 20% (i.e., Yes in step S21), the process proceeds on to step S22. If, on the other hand, the engine ECU 30 determines that the engine load is equal to or less than 20% (i.e., No in step S21), the process returns to the beginning of the routine.

Next, the engine ECU 30 determines whether the engine coolant temperature is higher than −10° C. based on a signal received from the coolant temperature sensor 35 (step S22).

If the engine ECU 30 determines that the engine coolant temperature is higher than −10° C. (i.e., Yes in step S22), the process proceeds on to step S23. If, on the other hand, the engine ECU 30 determines that the engine coolant temperature is equal to or less than −10° C. (i.e., No in step S22), the process returns to the beginning of the routine.

Next the engine ECU 30 executes rotational variation calculation control (step S23). More specifically, the engine ECU 30 calculates the rotational variation based on the required time during a complete misfire, the required time during complete combustion, and the required time that it takes for the crankshaft 19 to rotate 180° in the current combustion stroke, and then adds this current rotational variation to the cumulative value of the rotational variation thus far that is stored in the RAM, similar to steps S11 and S12 in the learning value correcting routine of the first example embodiment described above.

Then the engine ECU 30 integrates the cumulative variation counter (step S24). More specifically, the engine ECU 30 increases the integration counter in the RAM by 1.

Next, the engine ECU 30 references the integration counter in the RAM and determines whether the counter value has reached 1,000 (step S25).

If the engine ECU 30 determines that the integration counter value has reached 1,000 (i.e., Yes in step S25), the process proceeds on to step S26. In this case, the engine ECU 30 resets the integration counter value. If, on the other hand, the engine ECU 30 determines that the integration counter value has not reached 1,000 (i.e., No in step 25), the process returns to the beginning of the routine.

Next, the engine ECU 30 calculates the amount of learning value deviation (step S26). More specifically, the engine ECU 30 obtains the cumulative variation value stored in the RAM and calculates the amount of learning value deviation based on the cumulative value map stored in the ROM.

Next, the engine ECU 30 determines whether the amount of learning value deviation calculated in step S26 is equal to or greater than a predetermined value (step S27). If the engine ECU 30 determines that the amount of learning value deviation is equal to or greater than the predetermined value (i.e., Yes in step S27), then the process proceeds on to step S28. If, on the other hand, the engine ECU 30 determines that the amount of learning value deviation is less than the predetermined value (i.e., No in step S27), the process returns to the beginning of the routine.

Next, the engine ECU 30 corrects the learning value of the sub-feedback control (step S28). More specifically, in sub-feedback control, the engine ECU 30 corrects the value of an integral term in which the difference between the output value from the O2 sensor 34 and a value corresponding to the stoichiometric air-fuel ratio has been integrated, by the value calculated in step S26.

As described above, in the control apparatus of an internal combustion engine according to the second example embodiment of the invention, it is possible to inhibit rotational variation which may not accurately indicate the combustion state from being integrated when the engine 2 is in a low load state and the combustion state tends to vary. Accordingly, integrating the rotational variation only when the combustion state is stable makes it possible to further improve the accuracy of determining the degree of deterioration of the combustion state.

It is also possible to inhibit rotational variation that may not accurately indicate the combustion state from being integrated when the combustion state tends to vary, such as during a cold start of the engine 2. Accordingly, integrating the rotational variation only when the combustion state is stable makes it possible to further improve the accuracy of determining the degree of deterioration of the combustion state.

Incidentally, in the foregoing description, the engine ECU 30 stops updating the cumulative variation value and increasing the integration counter in the RAM when the engine load is equal to or less than 20%, as well as when the engine 2 has just been cold-started. However, the invention is not limited to this. That is, the engine ECU 30 may also stop updating the cumulative variation value and increasing the integration counter in the RAM when the combustion state may drastically change, such as when the combustion state may be affected by a disturbance.

For example, the engine ECU 30 may determine that the combustion state may be affected by a disturbance and skip updating the cumulative variation value and increasing the integration counter in the RAM i) when the amount of change in the engine speed is greater than a predetermined value, ii) when the amount of change in the throttle opening amount is greater than a predetermined value, iii) when the vehicle 1 is driving on a rough road, iv) when an air-conditioner in the vehicle 1 is switched on/off, v) when there is a shift change in a transmission, not shown, vi) when the clutch is on/off, or vii) when the idle is on/off.

Also, the engine ECU 30 may determine that the combustion state may drastically change and stop updating the cumulative variation value and increasing the integration counter in the RAM i) when the intake air temperature detected by the intake air temperature sensor 31 is below a predetermined value, ii) when a predetermined period of time has not yet passed after the engine 2 has been started up, iii) when the engine speed is less than the idle speed, iv) when the engine speed is greater than a predetermined speed, or v) when an abnormality in a sensor or the like in the vehicle 1 is detected.

Incidentally, when there is a possibility that the combustion state will change, the engine ECU 30 may also integrate only that rotational variation which is regarded as rotational variation that will effect the amount of learning value deviation, as described below, instead of constantly stopping updating the cumulative variation value and increasing the integration counter in the RAM.

Figure 8:
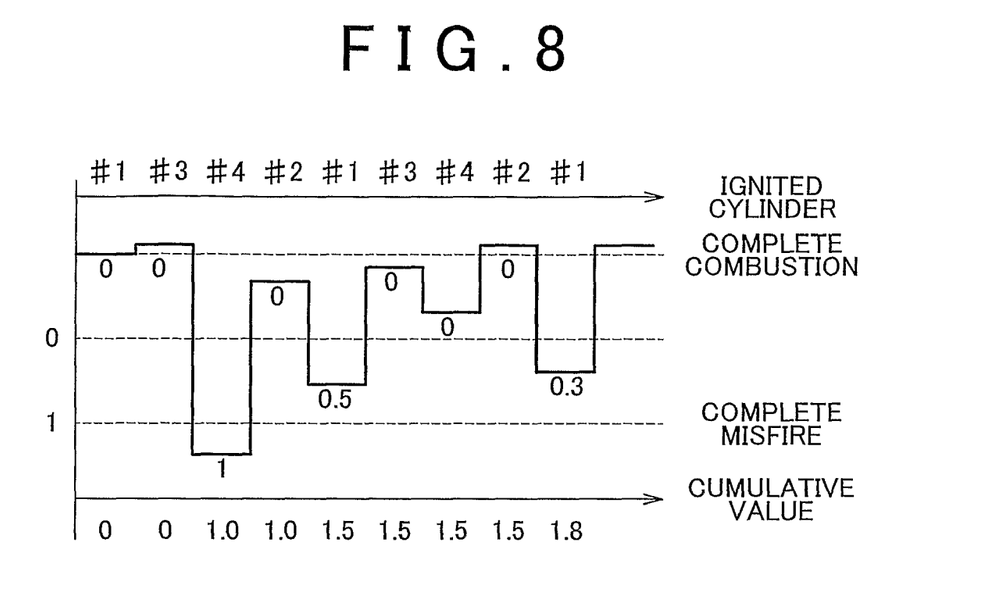
FIG. 8 is a chart showing a first example of a method for calculating the cumulative value of the rotational variation according to the second example embodiment of the invention.

FIG. 8 is a chart showing a first example of a method for calculating the cumulative value of the rotational variation according to the second example embodiment of the invention.

As shown in FIG. 8, the engine ECU 30 sets the rotational variation corresponding the required time during a complete misfire stored in the ROM beforehand to 1, and sets the rotational variation corresponding to the time between the required time during complete combustion and the required time during a complete misfire to 0. Then the engine ECU 30 calculates the rotational variation that corresponds to the current required time from the ratio of those required times and the required time calculated for the cylinder in which the combustion stroke is currently occurring. As a result, the region where the rotational variation is regarded as being 0 increases and it becomes possible to integrate only that rotational variation which will affect the amount of learning value deviation. Incidentally, the region where the rotational variation is regarded as being 0 is set to a region where it is considered that an amount of change of the rotational variation due to a disturbance becomes larger thereby it affects the accuracy of the amount of learning value deviation calculation.

Figure 9:
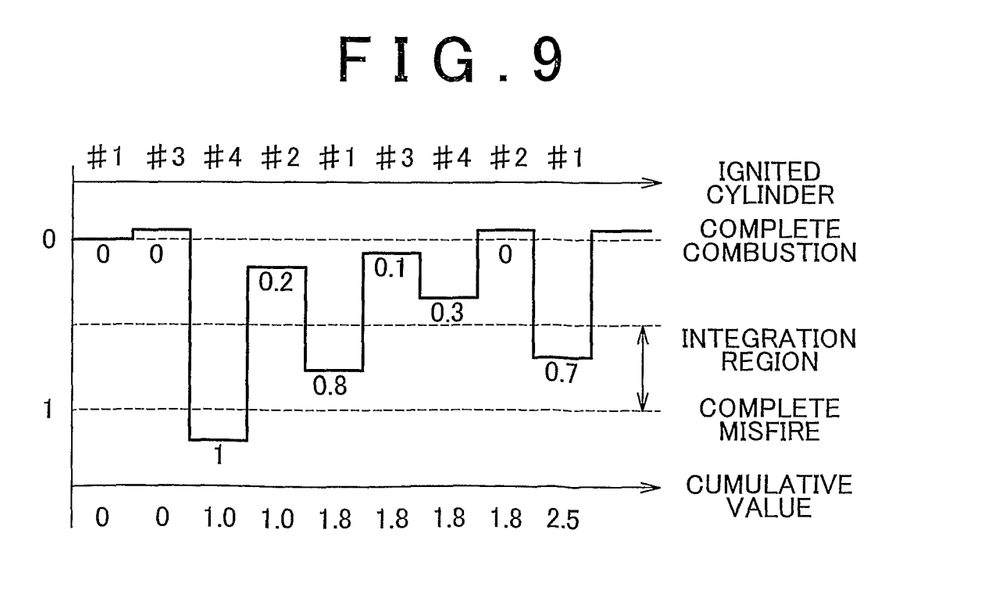
FIG. 9 is a chart showing a second example of a method for calculating the cumulative value of the rotational variation according to the second example embodiment of the invention.

FIG. 9 is a chart showing a second example of a method for calculating the cumulative value of the rotational variation according to the second example embodiment of the invention.

As shown in FIG. 9, the engine ECU 30 sets the rotational variation corresponding the required time during a complete misfire stored in the ROM beforehand to 1, and sets the rotational variation corresponding to the required time during complete combustion to 0. Then the engine ECU 30 calculates the rotational variation that corresponds to the current required time from the ratio of those required times and the required time calculated for the cylinder in which the combustion stroke is currently occurring. Then the engine ECU 30 then regards only rotational variation that is equal to or greater than a predetermined value as rotational variation that affects the learning value deviation, and integrates only that rotational variation.

Accordingly, when the rotational variation is less than a predetermined value, the engine ECU 30 increases the integration counter in the RAM by 1 but does not update the cumulative value of the rotational variation stored in the RAM. That is, the engine ECU 30 integrates the rotational variation as 0 when the rotational variation is less than the predetermined value. This makes it possible to inhibit a rotational variation that is regarded as one which will not affect the learning value deviation but in which there is an error due to a disturbance, from being integrated.

Incidentally, in the foregoing description, the rotational variation is calculated from the ratio of i) the required rotation time of the crankshaft 19 both during a complete misfire and during complete combustion to ii) the currently calculated required rotation time. However, the engine ECU 30 may also calculate the rotational variation based on the combustion pressure in the cylinder 11.

More specifically, the vehicle 1 may be provided with a combustion pressure sensor that measures the combustion pressure in the cylinder 11. The engine ECU 30 may then calculate the rotational variation by obtaining a signal indicative of the combustion pressure from the combustion pressure sensor and comparing the detected combustion pressure with a combustion pressure during complete combustion which is obtained through testing beforehand and stored in the ROM. In this case, the difference of 1 minus the ratio of the measured combustion pressure to the combustion pressure during complete combustion may be used as the rotational variation described above. Further, the amount of learning value deviation may also be obtained by integrating this calculated rotational variation and referencing the cumulative value map stored in the ROM, just like the amount of learning value deviation described above.

Also, the engine ECU 30 may calculate the rotational variation using ion current from ions produced during combustion.

More specifically, the vehicle 1 may be provided with an ion ammeter that detects ion current generated in the cylinder 11 during the combustion stroke. The engine ECU 30 may then calculate the rotational variation by obtaining a signal indicative of the amount of the ion current from the ion ammeter and comparing the detected ion current value with an ion current value during complete combustion which is obtained through testing beforehand and stored in the ROM. In this case, the difference of 1 minus the ratio of the detected ion current value to the ion current value during complete combustion may be used as the rotational variation described above. Further, the amount of learning value deviation may also be obtained by integrating this calculated rotational variation and referencing the cumulative value map stored in the ROM, just like the amount of learning value deviation described above.

As described above, the control apparatus of the internal combustion engine according to the example embodiment of the invention is able to effectively determine the degree of deterioration of the combustion state that is occurring in the internal combustion engine, and is useful for a control apparatus of an internal combustion engine that corrects air-fuel ratio control according to the degree of deterioration of the combustion state.

The invention claimed is:

1. A vehicle comprising:
an internal combustion engine having a plurality of cylinders;
an exhaust gas purification catalyst which is arranged in an exhaust passage of the internal combustion engine and purifies exhaust gas;
a first air-fuel ratio detecting portion that is arranged upstream of the exhaust gas purification catalyst;
a second air-fuel ratio detecting portion that is arranged downstream of the exhaust gas purification catalyst; and
a control apparatus of the internal combustion engine,
wherein the control apparatus executes main feedback control that controls an air-fuel ratio of the internal combustion engine based on a detection value of the first air-fuel ratio detecting portion, and sub-feedback control that calculates a learning value for correcting the main feedback control based on a detection value of the second air-fuel ratio detecting portion; and
wherein the controlling apparatus includes a rotational variation calculating portion that calculates a rotational variation of an output shaft of the internal combustion engine based on combustion of each of the cylinders, a variation integrating portion that calculates a cumulative value of the rotational variation by adding the rotational variation calculated by the rotational variation calculating portion to the rotational variation integrated thus far, an integration counting portion that counts the number of times the rotational variation has been integrated by the variation integrating portion, a combustion state estimating portion that estimates a combustion state of the internal combustion engine according to the cumulative value of the rotational variation integrated by the variation integrating portion, on the condition that the number of integrations counted by the integration counting portion has reached a predetermined value; and a learning value correcting portion that corrects the learning value of the sub-feedback control according to the combustion state estimated by the combustion state estimating portion.

2. The vehicle according to claim 1,
wherein the control apparatus further includes a rotational position detecting portion that detects a rotational position of the output shaft of the internal combustion engine, and a required time calculating portion that calculates the required time that it takes for the output shaft to rotate a predetermined angle from the combustion stroke of the cylinders, based on the rotational position of the output shaft detected by the rotational position detecting portion, and
wherein the rotational variation calculating portion calculates the rotational variation of the output shaft based on a pre-obtained required time during a complete misfire, which is the time that it takes for the output shaft to rotate die predetermined angle when a complete misfire occurs in the cylinders during the combustion stroke, and a pre-obtained required time during complete combustion, which is the time that it takes for the output shaft to rotate the predetermined angle when complete combustion occurs in the cylinders during the combustion stroke, and the required time calculated by the required time calculating portion.

3. The vehicle according to claim 1, further comprising:
a combustion pressure detecting portion that detects a combustion pressure in the cylinders,
wherein the rotational variation calculating portion calculates the rotational variation of the output shaft by comparing the combustion pressure detected by the combustion pressure detecting portion with a pre-obtained combustion pressure during complete combustion.

4. The vehicle according to claim 1, further comprising:
an ion current detecting portion that detects ion current produced inside the cylinders during the combustion stroke,
wherein the rotational variation calculating portion calculates the rotational variation of the output shaft by comparing the ion current value detected by the ion current detecting portion with a pre-obtained ion current value during complete combustion.

5. The vehicle according to claim 1,
wherein the control apparatus further includes a disturbance detecting portion that detects a disturbance that contributes to variation in the combustion state of the internal combustion engine, and
wherein the variation integrating portion stops integrating the rotational variation when a disturbance that contributes to variation in the combustion state is detected by the disturbance detecting portion.

6. The vehicle according claim 5, wherein the disturbance detecting portion detects a load of the internal combustion engine being equal to or less than a predetermined value as a disturbance that contributes to variation in the combustion state.

7. The vehicle according to claim 5, wherein the disturbance detecting portion detects a coolant temperature of the internal combustion engine being equal to or less than a predetermined value as a disturbance that contributes to variation in the combustion state.

8. A control method of a vehicle that includes an internal combustion engine having a plurality of cylinders; an exhaust gas purification catalyst which is arranged in an exhaust passage of the internal combustion engine and purifies exhaust gas; a first air-fuel ratio detecting portion that is arranged upstream of the exhaust gas purification catalyst; a second air-fuel ratio detecting portion that is arranged downstream of the exhaust gas purification catalyst; and a control apparatus of the internal combustion engine, the control method comprising:

executing main feedback control that controls an air-fuel ratio of the internal combustion engine based on a detection value of the first air-fuel ratio detecting portion;

executing sub-feedback control that calculates a learning value for correcting the main feedback control based on a detection value of the second air-fuel ratio detecting portion;

calculating a rotational variation of an output shaft of the internal combustion engine based on combustion of each of the cylinders;

calculating a cumulative value of the rotational variation by adding the calculated rotational variation to the rotational variation integrated thus far;

counting the number of times the rotational variation has been integrated;

estimating a combustion state of the internal combustion engine according to the cumulative value of integrated rotational variation, on the condition that the number of counted integrations has reached a predetermined value; and correcting the learning value of the sub-feedback control according to the estimated combustion state.

* * * * *